United States Patent [19]

DeGhetto

[11] Patent Number: 4,600,508
[45] Date of Patent: Jul. 15, 1986

[54] CONTAMINATION REMOVAL SYSTEM
[75] Inventor: Kenneth A. DeGhetto, Livingston, N.J.
[73] Assignee: Foster Wheeler Energy Corporation, Livingston, N.J.
[21] Appl. No.: 581,627
[22] Filed: Feb. 21, 1984
[51] Int. Cl.[4] .................. E02B 1/00; B01D 57/00
[52] U.S. Cl. ................................. 210/170; 210/747
[58] Field of Search .............. 134/25.1, 25.5, 40, 134/42; 210/747, 805, 170, 532.2; 405/128, 129

[56] References Cited
U.S. PATENT DOCUMENTS 3,425,555  2/1969  Ridgeway ..................... 210/170
3,947,327  3/1976  Greenfield et al. ............. 210/513
4,167,973  9/1979  Forte et al. ..................... 210/170
4,435,292  3/1984  Kirk et al. ...................... 210/747

Primary Examiner—Ivars Cintins
Attorney, Agent, or Firm—Marvin A. Naigur; John E. Wilson; Warren B. Kice

[57] ABSTRACT

A system and method for removing contaminated fluid from the ground in which water is pumped through a perforated pipe system into the ground to be decontaminated. The water and the contaminants are then drawn into a second pipe system and to a treatment unit for separating the contaminants from the water before the latter is returned to the first perforated pipe system.

8 Claims, 7 Drawing Figures

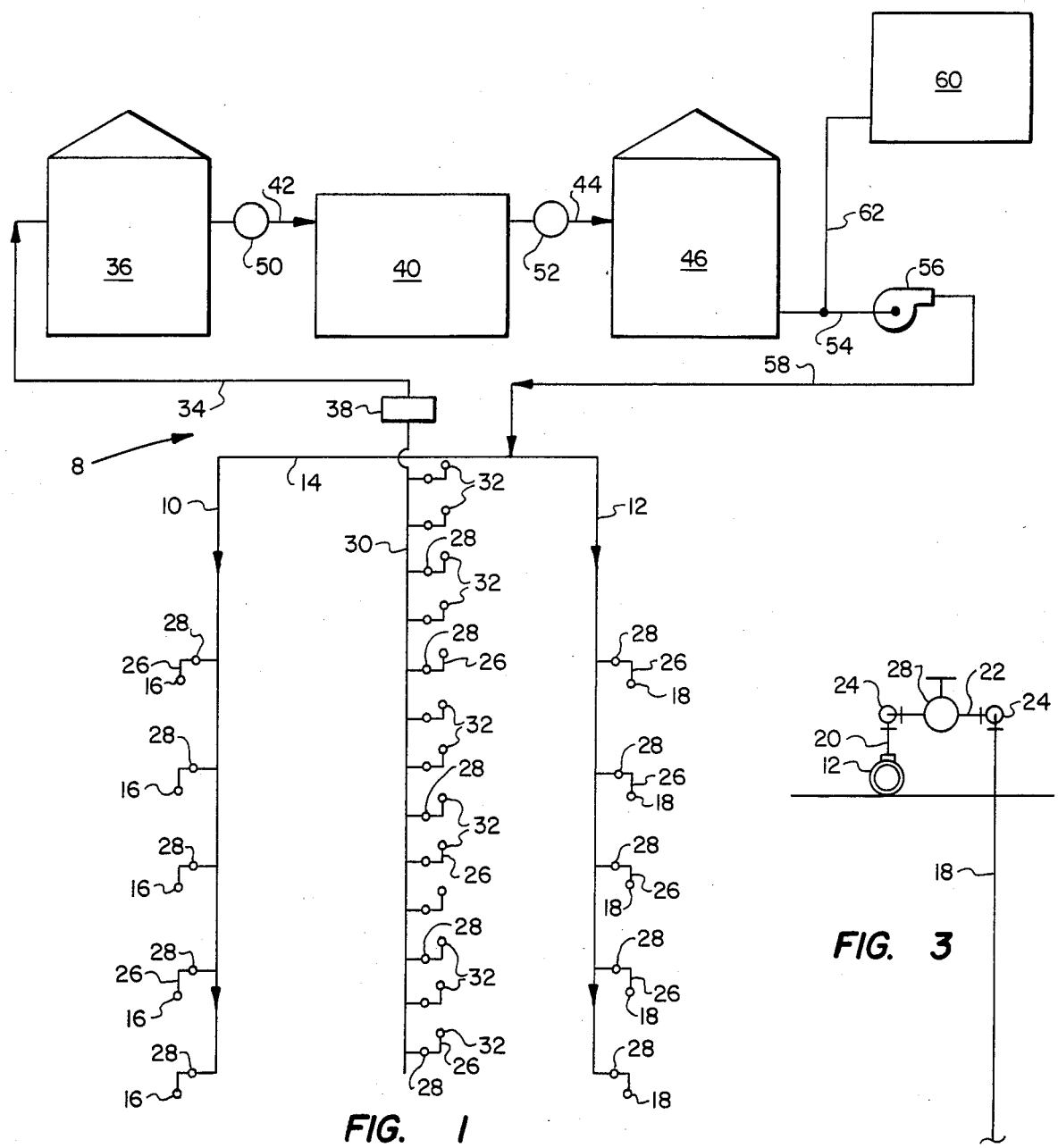
FIG. 1
FIG. 3
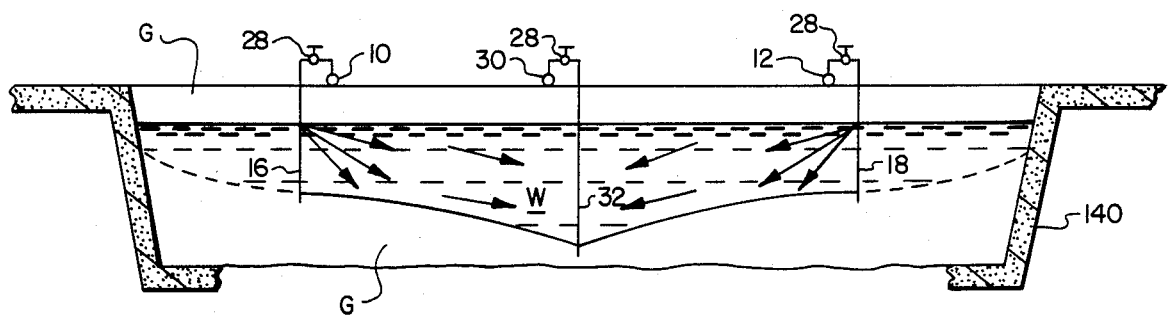
FIG. 2

CONTAMINATION REMOVAL SYSTEM

BACKGROUND OF THE INVENTION

This invention relates to a contamination removal system and method and, more particularly, to such a system and method for removing contaminants from the ground.

In cases where there are spills of contaminants, such as toxic materials, hydrocarbon materials, chemical wastes, etc. into or onto the ground, the materials will contaminate the surrounding ground water through action of the natural movement of water through the ground. If the spills are not isolated and the contaminants somehow removed, they will spread beyond the original spill area through the ground water system thereby endangering water supplies. Although, in view of the above, it is highly desirable to remove the contaminants from the area, few options are available. In some cases, physical removal and disposal or treatment of the soil is required. Alternatively, the spill site may be isolated to a depth below which the spill traveled via ground water action, and the contaminants retained in this area of ground isolated from surrounding areas. However, these methods are very expensive and do not eliminate the contaminants.

SUMMARY OF THE INVENTION

It is therefore an object of the present invention to provide a system and method of the above type in which contaminants are removed from the ground in an efficient, yet relatively inexpensive, manner.

It is a further object of the present invention to provide a system and method of the above in which water is pumped into the ground for mixing with the contaminants and facilitating their removal from the ground.

It is a further object of the present invention to provide a system and method of the above type in which the contaminants are removed from the water before the latter is circulated back into the system.

Toward the fulfillment of these and other objects, according to the system and method of the present invention a plurality of perforated pipes are connected to a supply header for distributing water under the force of a pump throughout the contaminated area. An additional set of perforated pipes are connected to a return header for withdrawing the water and the contaminants from the ground. The contaminants are removed from the water before the latter is recycled back to the system.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which:

FIG. 1 is a diagramatic view of the system of the present invention shown in a typical installation;

FIG. 2 is a cross sectional view depicting a portion of the system of the present invention;

FIG. 3 is a schematic view depicting a portion of the system of the present invention;

DESCRIPTION OF THE PREFERRED EMBODIMENTS

Figure 4:
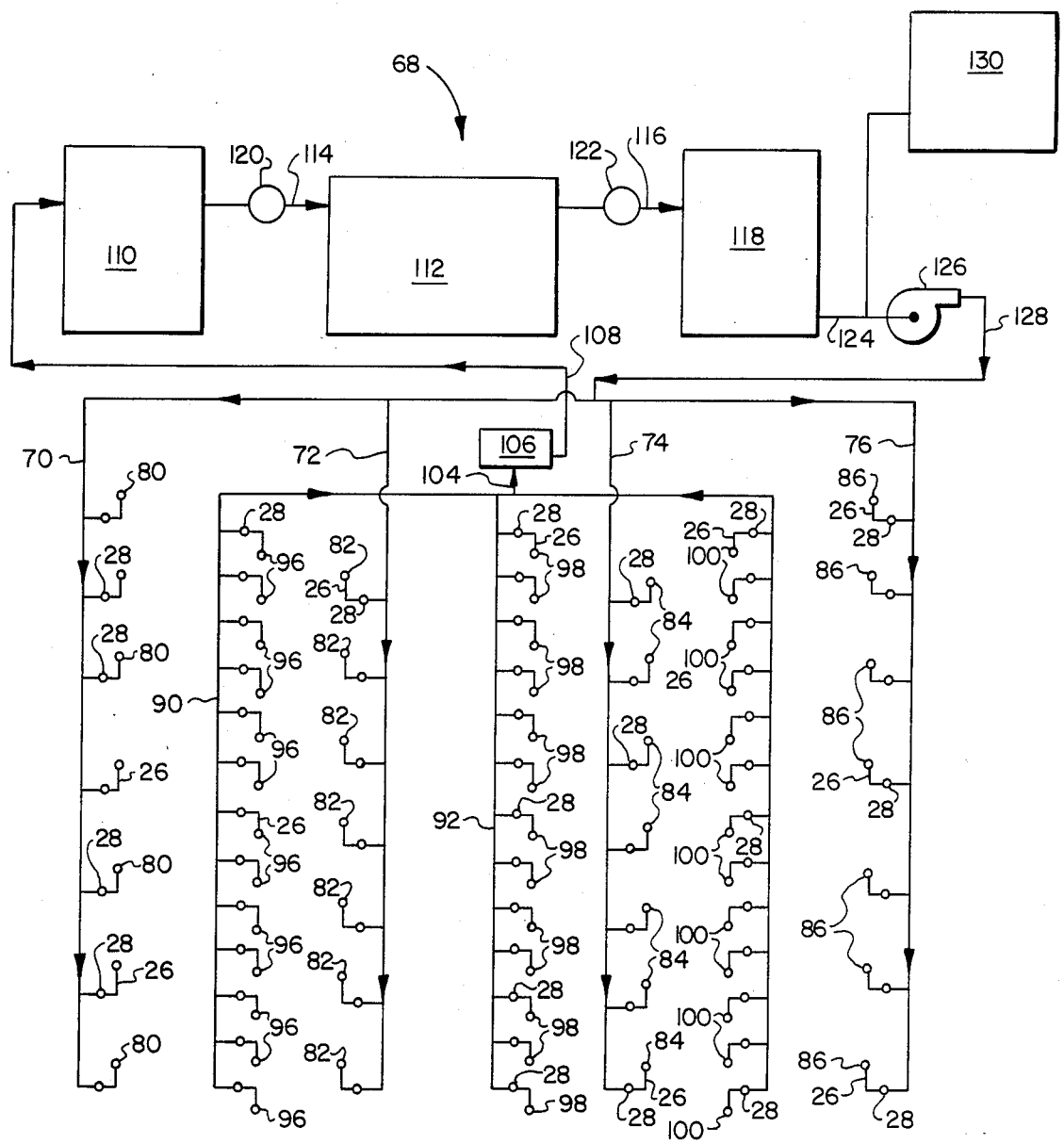
FIGS. 4 and 5 are views similiar to FIGS. 1 and 2 respectively, but depicting an alternate embodiment of the present invention.

Referring to FIGS. 1 and 2 of the drawings, there is shown a single-field decontamination process system generally designated by the reference numeral 8. The reference numerals 10 and 12 refer to a pair of horizontally extending, spaced parallel supply headers, respectively, which rest on the ground along the longitudinal margins of the area to be decontaminated, where the ground material has been designated G and the water table has been designated W. One end of each header 10 and 12 is connected to a cross-header 14 which extends perpendicularly to the headers 10 and 12 and which is connected to each by an elbow connector, or other conventional device.

A plurality of spaced, vertical risers, shown by the reference numerals 16 and 18, extend into the ground G and the water table W for a distance corresponding to the depth of the area to be decontaminated, with their upper ends extending slightly above ground level and immediately adjacent the supply headers 10 and 12, respectively.

The risers 16 and 18 are connected to the headers 10 and 12, respectively, in a manner shown in detail in FIG. 3 in connection with a riser 18 and the header 12. More particularly, a vertical pipe 20 extends upwardly from the header 12 and a horizontal pipe 22 is connected at each end to a swing joint 24. One swing joint 24 is connected to the upper end of the pipe 20 and the other swing joint 24 is connected, via a horizontal pipe segment 26 (FIG. 1), to the riser 18. A valve 28 is disposed in the horizontal pipe 22 to control the flow of water from the riser 18 to the header 12. It is understood that the risers 16 are connected to the header 10 in an identical manner.

The risers 16 and 18 are perforated along their entire lengths to permit water to discharge therefrom towards the center of the area to be decontaminated, as will be described.

A horizontal return header 30 extends on the ground G and between the supply headers 10 and 12 in a spaced parallel relation thereto. A plurality of risers 32 extend through the ground G and into the water table W for a distance corresponding to the depth of the area to be decontaminated, with their upper ends extending slightly above ground level and immediately adjacent the return header 30. The risers 32 are perforated along their entire lengths and are connected to the header 30 in the same manner as the risers 18 are connected to the header 12 as discussed above in connection with reference to FIG. 3.

The number of risers 16, 18 and 32 are dependent upon the hydraulics of each system which is designed for a given situation and in certain cases there could be as few as one riser provided for each of the headers 10, 12 and 30.

A pipe 34 connects an end of the return header 30 to a storage tank 36. A vacuum pump 38 is connected to the pipe 34 for drawing water and contaminants into and through the risers 32 and the header 30, whereby they are passed into the storage tank 36. It is intended that the pump 38 will provide sufficient suction when the risers 32 are sunk into a contaminated area to a depth in the neighborhood of 25 feet. When decontamination exists below the 25 foot level it is possible to obtain the necessary additional section pressure by installing a submergible pump at the bottom of each of the risers 32 which would be located in the water table W.

The inlet of a treatment unit 40 is connected, via a pipe 42, to the outlet of the storage tank 36 and is adapted to operate in any conventional manner to separate the contaminants from the water. The treatment unit disclosed in U.S. Pat. No. 3,947,327, is exemplary of the type of unit contemplated and the disclosure of this patent is hereby incorporated by reference.

A pipe 44 connects the outlet of the treatment unit 40 to another storage tank 46 for storing the clean water received from the treatment unit. A pair of booster pumps 50 and 52 are disposed in the pipes 42 and 44, respectively, for pumping the water to and from the treatment unit 40 as needed.

The outlet of the storage tank 46 is connected, via a pipe 54 to the inlets of a pump 56, whose outlet is connected, via a pipe 58, to the cross-header 14. As a result, the clean water is re-introduced to the system for discharging into the ground G through the supply headers 10 and 12 and their respective risers 16 and 18.

Make-up water from a storage tank 60 is supplied, via a pipe 62, to the pump 56 for introduction to the supply headers 10 and 12 and the risers 16 and 18 as needed.

In operation, water from the pump 56 is passed, via the pipe 58 and the cross-header 14, to the supply headers 10 and 12. The water passes from the supply headers 10 and 12 into their respective risers 16 and 18 and, through the perforations in the latter, into a fairly wide area of the ground G as shown in FIG. 2 where it mixes with the contaminants. The vacuum pump 38 draws the water and contaminants into the perforated vertical risers 32 and the header 30 whereby they pass, via the pipe 34, to the storage tank 36. The vacuum pump 38 and pump 56 can operate continuously in situations involving severe contamination or intermittently through a control system for lesser contaminated areas.

From the storage tank 36 the water and contaminants are passed, via the pipe 42, to the water treatment unit 40 which operates to remove the contaminants from the water and the latter is passed, via the pipe 44, to the storage tank 46. This water, along with make-up water from the tank 60, is then circulated through the system, including the pump 56, the pipe 58, the cross-header 14 and the supply headers 10 and 12.

It is thus seen that this system and method of the present invention provide a simple yet efficient means of decontaminating a particular area of ground without a significant cost in materials and labor.

Figure 5:
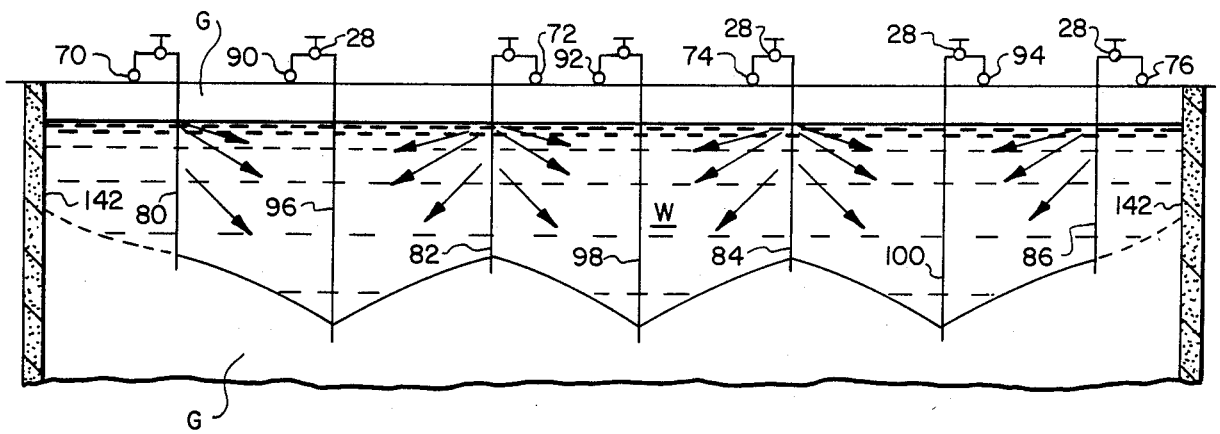

Referring to FIGS. 4 and 5 there is shown a multi-field decontamination process system generally designated by the reference numeral 68. The multi-field decontamination process system 68 is designed to cover a larger area than the single-field decontamination process system 8 and includes four horizontally extending, spaced parallel supply headers 70, 72, 74 and 76 which rest on the ground G. One end of each of the headers 70, 72, 74 and 76 is connected to a cross-header 78 in a conventional manner.

A plurality of spaced, vertical risers, shown by the reference numerals 80, 82, 84 and 86, extend into the ground G and into the water table W for a distance corresponding to the depth of the area to be decontaminated, with their upper ends extending slightly above ground level and immediately adjacent the supply headers 70, 72, 74 and 76, respectively.

The risers 80, 82, 84 and 86 are connected to their respective headers 70, 72, 74 and 76 in a manner shown in detail in FIG. 3 in connection with a riser 18 and the header 12 of the previous embodiment.

The risers 80, 82, 84 and 86 are perforated along their entire lengths to permit water to discharge therefrom towards the center of the area to be decontaminated as shown in FIG. 5.

Three horizontal, parallel return headers 90, 92 and 94 extend on the ground G in an alternating spaced relationship with the supply headers 70, 72, 74 and 76. A plurality of risers 96, 98 and 100 extend into the ground G and into the water table W for a distance corresponding to the depth of the area to be decontaminated, with their upper ends entending slightly above ground level and immediately adjacent the return headers 90, 92 and 94, respectively. The risers 96, 98 and 100 are perforated and are connected to the headers 90, 92 and 94, respectively, in the same manner as discussed above. A cross header 102 is connected to the ends of the return headers 90, 92 and 94 and is connected, via a pipe 104 to the inlet of a vacuum pump 106. A pipe 108 connects the outlet of the vacuum pump 106 to a storage tank 110.

The inlet of a treatment unit 112 is connected, via a pipe 114, to the outlet of the storage tank 110 and is adapted to operate in any conventional manner as discussed above in connection with the treatment unit 40 of the previous embodiment.

A pipe 116 connects the outlet of the treatment unit 112 to another storage tank 118 for storing the clean water received from the treatment unit. A pair of booster pumps 120 and 122 are disposed in the pipes 114 and 116, respectively, for pumping the water to and from the treatment unit 112 as needed.

The outlet of the storage tank 118 is connected, via a pipe 124, to the inlet of a pump 126, whose outlet is connected, via a pipe 128, to the cross-header 78. As a result, the clean water is re-introduced to the system for discharging into the ground G through the supply headers 70, 72, 74 and 76 and their respective risers 80, 82, 84 and 86.

Make-up water from a storage tank 130 is supplied to the pump 126 for introduction to the supply headers and their risers as needed.

In operation, water from the pump 126 is passed, via the pipe 128 and the cross-header 78, to the supply headers 70, 72, 74 and 76, and into their respective risers 80, 82, 84 and 86. The water discharges through the perforations in the latter into the ground G and the water table W as shown in FIG. 5 where it mixes with the contaminants. The vacuum pump 106 draws the water and contaminants into the perforated vertical risers 96, 98 and 100 and the headers 90, 92 and 94 whereby they are introduced into the cross header 102 and pass, via the pipe 108, to the storage tank 110. The vacuum pump 106 and pump 126 could operate either constantly or intermittently as discussed above in connection with the previous embodiment.

From the storage tank 110 the water and contaminants are passed, via the pipe 114, to the water treatment unit 112 which operates to remove the contaminants from the water and the latter is passed, via the pipe 116, to the storage tank 118. This water, along with make-up water from the tank 130, is then circulated through the system, including the pump 126, the pipe 128, and cross-header 78 and the supply headers 70, 72, 74 and 76.

It is thus seen that the system and method of the embodiment of FIGS. 4 and 5 enjoys all of the advantages of the embodiment of FIGS. 1-2 yet covers a much larger area with a minimum of additional piping.

Figure 6:
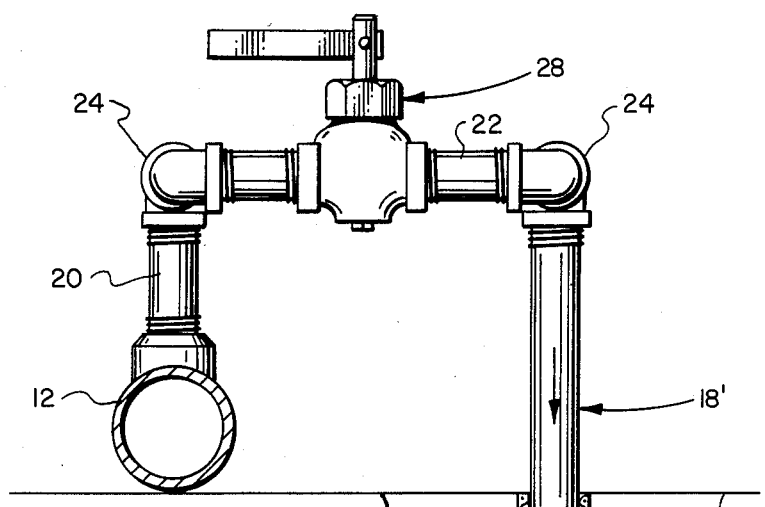
FIGS. 6 and 7 are partial elevational views depicting details of a portion of the system of the present invention.
Figure 6:
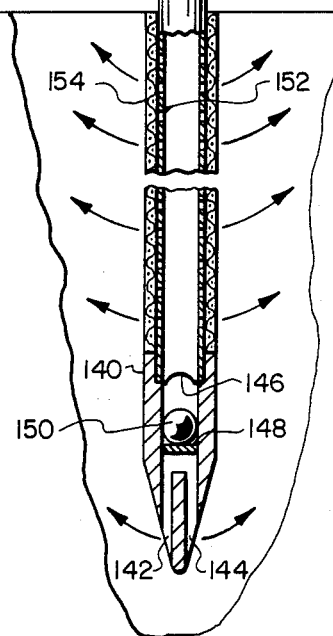
Figure 7:
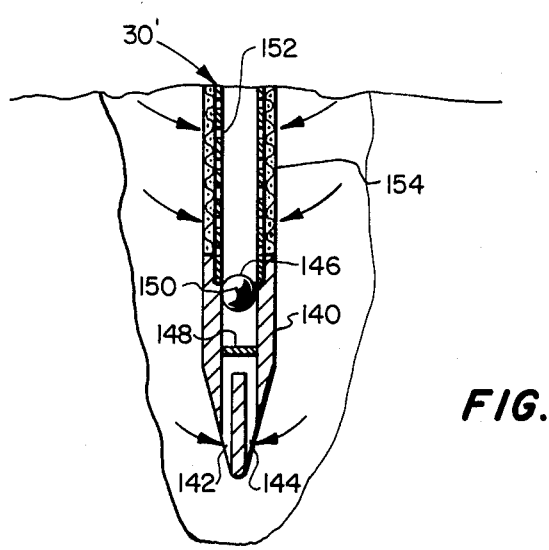

The reference numerals 18' and 30' in FIGS. 6 and 7 respectively depict an alternate embodiment of the risers 18 and 30 respectively. The riser 18' is shown with its associated header 12, pipes 20 and 22, swing joint 24, pipe segment 26 and valve 28, it being understood that the riser 30' is connected in the same manner.

Each riser 18' and 30' has a reinforced tapered lower end portion 140 defining a pair of discharge slots 142 and 144. An upper valve seat 146 and a lower valve seat 148 are disposed within the end portion 140 and a vall valve 150 moves between the valve seats 146 and 148 to control the flow of water through the risers 18' and 30' and their respective end portions 140, as will be described.

A plurality of radially extending perforations 152 are axially spaced along the risers 18' and 30' including the end portion 140, and a screen 154 extends around that portion of the risers between their respective end portions 140 and ground level.

During installation, the risers 18' and 30' are connected to their respective pipe segments 26 and their respective valves 28 are opened to permit water to enter the risers and the end portions 140. The force of the water acting on the ball valve 150 moves it to the lower seat 148.

When the ball valve 150 is seated on the lower seat 148, a small clearance is provided between the ball valve 150 and the corresponding inner wall of the end portion 140 to define a small path for water flow at an accelerated velocity. Therefore, during installation a small jet stream of water passes through the slots 142 and 144 to aid in softening the surrounding earth and facilitate the installation of the risers 18' and 30' into the ground.

In normal operation of the riser 18', the force of the water will maintain the ball valve 150 on the lower seat and the water will discharge through the perforations 152 and through the slots 142 and 144 into the ground G or the water table W.

In normal operation of the riser 30' the vacuum created through the riser will pull the ball valve 150 upwardly against the upper valve seat 146, and the design of the latter seat, the corresponding upper wall portion of the end portion 140 and the ball valve is such that all flow upwardly through this portion of the end portion 140 is blocked. Thus any undesirable ingress of soil, rocks, or the like, is prevented.

It is understood that the risers 80, 82, 84 and 86 of the embodiment of FIGS. 4 and 5 can be configured identically to the riser 18' of FIG. 6 and that the risers 96, 98 and 100 can be configured identically to the riser 30' of FIG. 7.

The following is an example of the parameters involved in decontaminating a 100 feet by 100 feet area having the type of soil indicated and utilizing the system of FIGS. 4 and 5 with headers having an 8" diameter, supply risers having a 3" diameter and return risers having a 1½" diameter.

| Type of Soil | Max. Depth | Water Req'd | Supply Riser Spcng | No. of Supply Risers | Return Riser Spcng | No. of Return Risers |
|---|---|---|---|---|---|---|
| Coarse Sand | 15' | 2100 gpm | 20' | 20 | 3' | 99 |
| Medium Sand | 17½' | 2000 gpm | 25' | 16 | 4' | 75 |
| Fine Sand | 22' | 1500 gpm | 40' | 9 | 5' | 60 |

It is understood that several changes may be made in the foregoing without departing from the scope of the invention. For example, the number of risers connected to each header along with the size and spacing of the risers and the headers can be varied.

Further, the particular configuration of each piping network can be varied in accordance with the particular area to be decontaminated.

If desirable, a particular volume of earth can be evacuated from a given area and a pit formed which can be lined with clay, concrete or the like, as shown by the reference numerals 140 and 142, in FIG. 2 and FIG. 5, respectively, and the system of the present invention can be installed in the pit to decontaminate soil that is placed in the pit for treatment. The contamination material could be removed to another location after the decontamination operation is been completed and additional contaminated material could be placed in the pit.

Both the single-field decontamination process system 8 and the multi-field decontamination process system 68 are designed to remain in place for relatively long periods of time in areas of extreme contamination or removal for reuse from one contaminated area to another in area of less contamination.

While the multi-field process system 68 of FIGS. 4 and 5 covers three fields of contamination which is essentially three times the size of the single-field decontamination process system 8, it should be understood that plurality of contamination fields are contemplated in connection with the multi-field contamination process system 68, consistent with the capacity of the component equipment used. Thus, the multi-field contamination system 68 could take the form of two fields of contamination or more than three fields of contamination.

It is understood that any or all of the storage tanks 36, 46 and 60 of the first embodiment as well as the storage tanks 110, 118 and 130 of the second embodiment could be replaced by sealed ponds.

Other modifications, changes, and substitutions are intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A system for removing contaminants from the ground comprising a first network of vertically extending perforated risers extending into the ground; means for pumping water through said risers for discharging the water through said perforations and into said ground such that the water absorbs the contaminants; a second network of vertically extending perforated risers disposed in said ground in the vicinity of said first network of risers; vacuum means for drawing water, along with the absorbed contaminants, through the perforations of said second network of risers; means defining at least one discharge slot at the lower end portion of each of said risers; a valve unit disposed in each riser for controlling the flow of water through said riser and said slots, each valve unit including a pair of spaced valve seats, and a valve member moveable in said riser between said valve seats, said valve unit and said valve seats being configured to permit a relatively high velocity discharge of water from said slots of the risers connected to said pumping means to facilitate installation of said risers into said ground, and to prevent flow into said slots of the risers connected to said vaccuum means to prevent the ingress of solid materials into said risers; means connected to said second pipe network for removing the contaminants from said water; and means connecting the contaminant-removal means to said pumping means for recirculating said water through said first pipe network.

2. The system of claim 1 further comprising a cross-header and two headers connected to the respective ends of said cross-header to form a substantially U-shaped configuration, said first network of risers being connected to said headers.

3. The system of claim 2 further comprising a cross-header, and a plurality of headers connected to said cross-header and to said risers of said first and second network of risers.

4. The system of claims 2 or 3 wherein said pumping means comprises a pump, and means connecting said pump to the cross-header associated with said first network of risers for distributing said water through the corresponding headers and risers.

5. The system of claim 1 further comprising a header connected to said second network of risers.

6. The system of claims 2 or 5 wherein said headers extend horizontally and rest on the upper surface of said ground.

7. The system of claims 3 or 5 wherein said vacuum means comprises a vacuum pump and means connecting said vacuum pump to the headers associated with said second network of risers for drawing said water and said contaminants into and through the corresponding risers and headers.

8. The system of claim 1 further comprising storage means connected to said contaminant-removal means for receiving said water from said contaminant-removal means.

* * * * *